US011519500B2

(12) United States Patent
Kannou et al.

(10) Patent No.: US 11,519,500 B2
(45) Date of Patent: Dec. 6, 2022

(54) ROTARY ACTUATOR

(71) Applicant: DENSO CORPORATION, Kariya (JP)

(72) Inventors: Fumiya Kannou, Kariya (JP);
Hiroyuki Kado, Kariya (JP); Mikine Kume, Kariya (JP); Kenichi Ooishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 136 days.

(21) Appl. No.: 16/847,974

(22) Filed: Apr. 14, 2020

(65) Prior Publication Data

US 2020/0332890 A1    Oct. 22, 2020

(30) Foreign Application Priority Data

Apr. 16, 2019 (JP) .............................. JP2019-077979

(51) Int. Cl.
| | | |
|---|---|---|
| *F16H 61/32* | (2006.01) | |
| *H02K 5/08* | (2006.01) | |
| *H02K 7/116* | (2006.01) | |
| *F16H 57/031* | (2012.01) | |
| *F16H 57/02* | (2012.01) | |

(52) U.S. Cl.
CPC .............. *F16H 61/32* (2013.01); *H02K 5/08* (2013.01); *H02K 7/116* (2013.01); *F16H 57/031* (2013.01); *F16H 2057/02034* (2013.01); *F16H 2057/02082* (2013.01); *F16H 2061/326* (2013.01)

(58) Field of Classification Search
CPC .................. F16H 61/32; F16H 57/031; F16H 2057/02034; F16H 2057/02082; F16H 2061/326; H02K 5/08; H02K 7/116
See application file for complete search history.

(56) References Cited

U.S. PATENT DOCUMENTS

| | | | | |
|---|---|---|---|---|
| 4,367,660 A | * | 1/1983 | Becker .................. | E05F 15/692 74/411 |
| 10,371,257 B2 | * | 8/2019 | Kume ..................... | H02K 11/33 |
| 2007/0163179 A1 | * | 7/2007 | Fukumura .............. | H02K 7/116 49/352 |

(Continued)

FOREIGN PATENT DOCUMENTS

| | | | | |
|---|---|---|---|---|
| EP | 1310453 A1 | * | 5/2003 | ............... B66D 1/22 |
| JP | 2017-203465 | | 11/2017 | |

OTHER PUBLICATIONS

U.S. Appl. No. 16/847,953, filed Apr. 14, 2020, Rotary Actuator.
(Continued)

*Primary Examiner* — Zakaria Elahmadi
(74) *Attorney, Agent, or Firm* — Nixon & Vanderhye P.C.

(57) ABSTRACT

A rotary actuator is used in a shift-by-wire system for a vehicle. The actuator includes a motor, an output shaft, a speed reducer, and a case. The motor includes a motor shaft. The output shaft is disposed in parallel with the motor shaft. The case houses the motor and the speed reducer. The case includes an upper case that houses the motor and a lower case that houses the speed reducer. The speed reducer includes a first reducer that includes a ring gear embedded in a resin portion of the lower case and a parallel-shaft type second reducer that includes a drive gear on the motor shaft and a driven gear on the output shaft. The ring gear includes an annular gear portion and a cover that protrudes radially inward from one end of the annular gear portion.

14 Claims, 9 Drawing Sheets

(56) References Cited

U.S. PATENT DOCUMENTS

| | | | |
|---|---|---|---|
| 2009/0189468 A1 | 7/2009 | Kume et al. | |
| 2013/0137303 A1* | 5/2013 | Yazaki | H01R 12/70 439/625 |
| 2017/0152943 A1* | 6/2017 | Kume | F16H 57/02 |
| 2018/0172133 A1* | 6/2018 | Kume | F16H 57/021 |
| 2019/0229588 A1* | 7/2019 | Takahashi | H02K 11/21 |
| 2020/0103024 A1* | 4/2020 | Jeon | F16H 63/3425 |

OTHER PUBLICATIONS

U.S. Appl. No. 16/847,974, filed Apr. 14, 2020, Rotary Actuator.
U.S. Appl. No. 16/847,989, filed Apr. 14, 2020, Rotary Actuator.
U.S. Appl. No. 16/847,788, filed Apr. 14, 2020, Rotary Actuator.
U.S. Appl. No. 16/847,801, filed Apr. 14, 2020, Rotary Actuator.
U.S. Appl. No. 16/847,820, filed Apr. 14, 2020, Rotary Actuator and Method of Manufacturing the Same.
U.S. Appl. No. 16/847,854, filed Apr. 14, 2020, Rotary Actuator.
U.S. Appl. No. 16/847,816, filed Apr. 14, 2020, Rotary Actuator.
U.S. Appl. No. 16/847,992, filed Apr. 14, 2020, Rotary Actuator.
U.S. Appl. No. 16/848,024, filed Apr. 14, 2020, Rotary Actuator.
U.S. Appl. No. 16/847,835, filed Apr. 14, 2020, Rotary Actuator.
U.S. Appl. No. 16/847,953, to Kume, et al., entitled: "Rotary Actuator", filed Apr. 14, 2020 (18 pages).
U.S. Appl. No. 16/847,989, to Kume, et al., entitled: "Rotary Actuator", filed Apr. 14, 2020 (20 pages).
U.S. Appl. No. 16/847,788 to Kume, et al., entitled: "Rotary Actuator", filed Apr. 14, 2020 (22 pages).
U.S. Appl. No. 16/847,801, to Kume, et al., entitled: "Rotary Actuator", filed Apr. 14, 2020 (26 pages).
U.S. Appl. No. 16/847,820, to Kato, et al., entitled: "Rotary Actuator and Method for Manufacturing the Same", filed Apr. 14, 2020 (26 pages).
U.S. Appl. No. 16/847,854, to Naitou, et al., entitled: "Rotary Actuator", filed Apr. 14, 2020 (23 pages).
U.S. Appl. No. 16/847,816, to Imai, et al., entitled: "Rotary Actuator", filed Apr. 14, 2020 (27 pages).
U.S. Appl. No. 16/847,992, to Shimada, et al., entitled: "Rotary Actuator", filed Apr. 14, 2020 (24 pages).
U.S. Appl. No. 16/848,024, to Shimada, et al., entitled: "Rotary Actuator", filed Apr. 14, 2020 (18 pages).
U.S. Appl. No. 16/847,835, to Kannou, et al., entitled: "Rotary Actuator", filed Apr. 14, 2020 (18 pages).

* cited by examiner

ROTARY ACTUATOR

CROSS REFERENCE TO RELATED APPLICATION

This application is based on Japanese Patent Application No. 2019-077979 filed on Apr. 16, 2019, the disclosure of which is incorporated herein by reference in its entirety.

TECHNICAL FIELD

The present disclosure relates to a rotary actuator.

BACKGROUND

A rotary actuator has been conventionally used as a driving unit of a shift-by-wire system for a vehicle. For example, an actuator has two shafts that is a motor shaft of a motor and an output shaft located in parallel with the motor shaft. A speed reducer is disposed in a driving force transmitting path extending between the motor and the output shaft. The speed reducer includes a first reducer formed of a sun gear and a ring gear, and a second reducer formed of a drive gear and a driven gear that is connected to the output shaft. The drive gear and the driven gear serve as parallel shafts type gears. A rotational speed of the motor is reduced by the first reducer and further reduced by the second reducer, and the rotation of the motor is transmitted to the output shaft through the driven gear.

The motor and the speed reducer are housed in a case. The case includes an upper case housing the motor and a lower case housing the speed reducer. The first reducer and the second reducer are arranged in this order from the motor along an axial direction of the motor. The ring gear is fixed to the upper case with screws.

SUMMARY

One aspect of the present disclosure is a rotary actuator used in a shift-by-wire system for a vehicle. The actuator includes a motor, an output shaft, a speed reducer, and a case. The motor includes a motor shaft. The output shaft is disposed in parallel with the motor shaft. The speed reducer reduces a rotational speed of the motor and transmits rotation of the motor at a reduced rotational speed to the output shaft. The case houses the motor and the speed reducer.

The case includes an upper case that houses the motor and a lower case that houses the speed reducer. The speed reducer includes a first reducer that includes a ring gear embedded in a resin portion of the lower case and a parallel-shaft type second reducer that includes a drive gear on the motor shaft and a driven gear on the output shaft. The ring gear includes an annular gear portion and a cover that protrudes radially inward from one end of the annular gear portion.

DETAILED DESCRIPTION

Hereinafter, a plurality of embodiments of a rotary actuator (hereinafter, referred to as an "actuator") will be described with reference to the drawings. In the embodiments, substantially the same components are denoted by the same reference numerals and description thereof is omitted.

To begin with, relative technologies of the present disclosure will be described first only for understanding the technical significance of the following embodiments. When a ring gear is screwed into an upper case, screws as fastening members are required. In addition, assembling process using screws would become more complicated. Similar to the screwing means described above, when a ring gear is press-fitted into the upper case, a ring for press-fitting may be required as a fastening member in the upper case. Thus, assembling process would become complicated as well.

The present disclosure has been provided in view of the above, and a rotary actuator that can be easily assembled without a fastening member will be presented in the following embodiments.

For example, one aspect of the present disclosure is a rotary actuator used in a shift-by-wire system for a vehicle. The actuator includes a motor, an output shaft, a speed reducer, and a case. The motor includes a motor shaft. The output shaft is disposed in parallel with the motor shaft. The speed reducer reduces a rotational speed of the motor and transmits rotation of the motor at a reduced rotational speed to the output shaft. The case houses the motor and the speed reducer.

The case includes an upper case that houses the motor and a lower case that houses the speed reducer. The speed reducer includes a first reducer that includes a ring gear embedded in a resin portion of the lower case and a parallel-shaft type second reducer that includes a drive gear on the motor shaft and a driven gear on the output shaft. The ring gear includes an annular gear portion and a cover that protrudes radially inward from one end of the annular gear portion.

By embedding the ring gear in the resin portion of the case by, for example, insert molding, it is not necessary to assemble the ring gear to the case during assembling process, and it is not necessary to use any fastening members. Therefore, the number of components can be reduced and assembling process can be simplified.

Further, since the ring gear has the cover, it is possible to prevent resin burrs generated during manufacturing process of the case from adhering to the gear portion of the ring gear. Further, since the ring gear is integrally formed with the case, deformation of the ring gear during operation of the rotary actuator can be avoided, and as a result gear efficiency is improved.

If the ring gear is screwed to the upper case, both the ring gear and the upper case must be positioned using positioning pins. In contrast, according to the one aspect of the present disclosure in which the ring gear is integrally formed with the lower case, the ring gear and the rotor of the motor can be prevented from offsetting from each other, and thus the gear efficiency is further improved.

First Embodiment

The actuator is used as a driving unit for a shift-by-wire system of a vehicle.
(Shift-by-Wire System)

Figure 1:
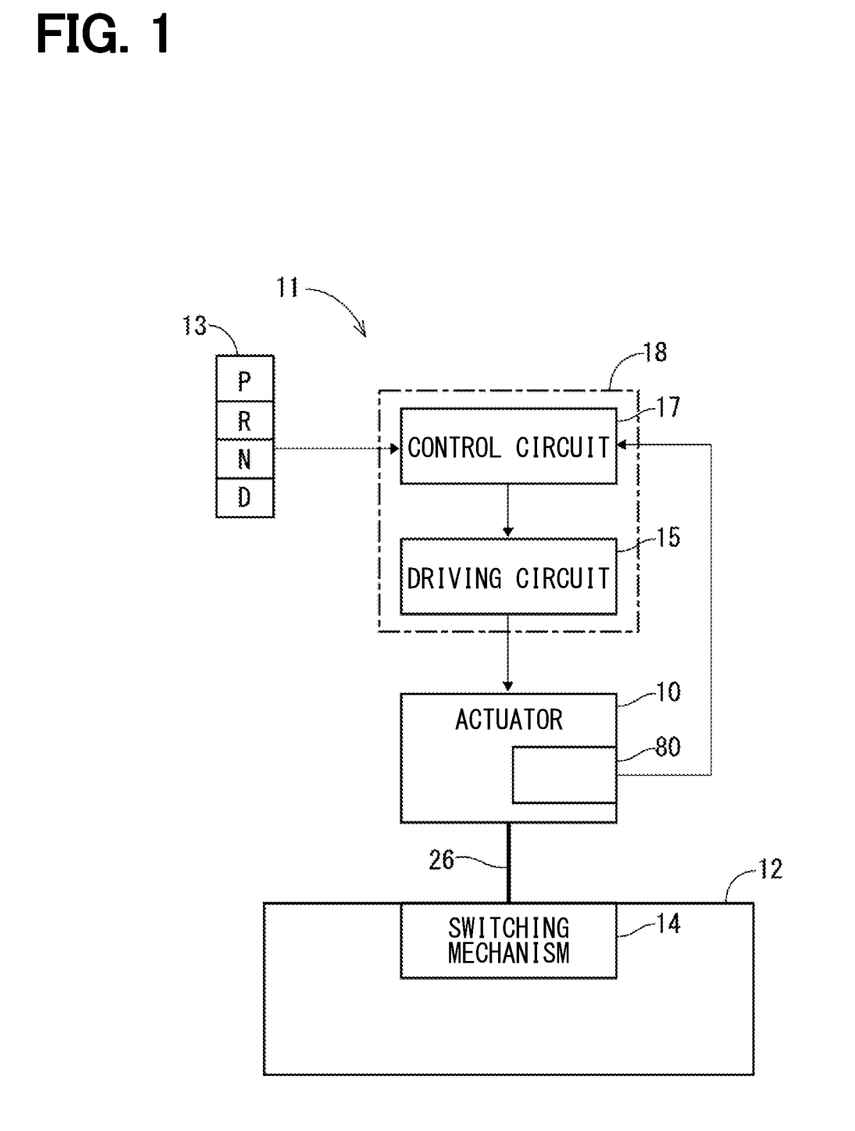
FIG. 1 is a schematic diagram showing a shift-by-wire system to which a rotary actuator according to a first embodiment is applied.

A configuration of the shift-by-wire system will be described with reference to FIGS. 1 and 2. As shown in FIG. 1, the shift-by-wire system 11 includes a shift operating device 13 that instructs a shift range of a transmission 12, the actuator 10 that drives a shift range switching mechanism 14 of the transmission 12, a driving circuit 15 that energizes the actuator 10, and a control circuit 17. The control circuit 17 controls the driving circuit 15 to drive the actuator 10 based on control signals for the shift range. The driving circuit 15 and the control circuit 17 configures an electronic control unit 18 (hereinafter, referred to as an ECU 18).

Figure 2:
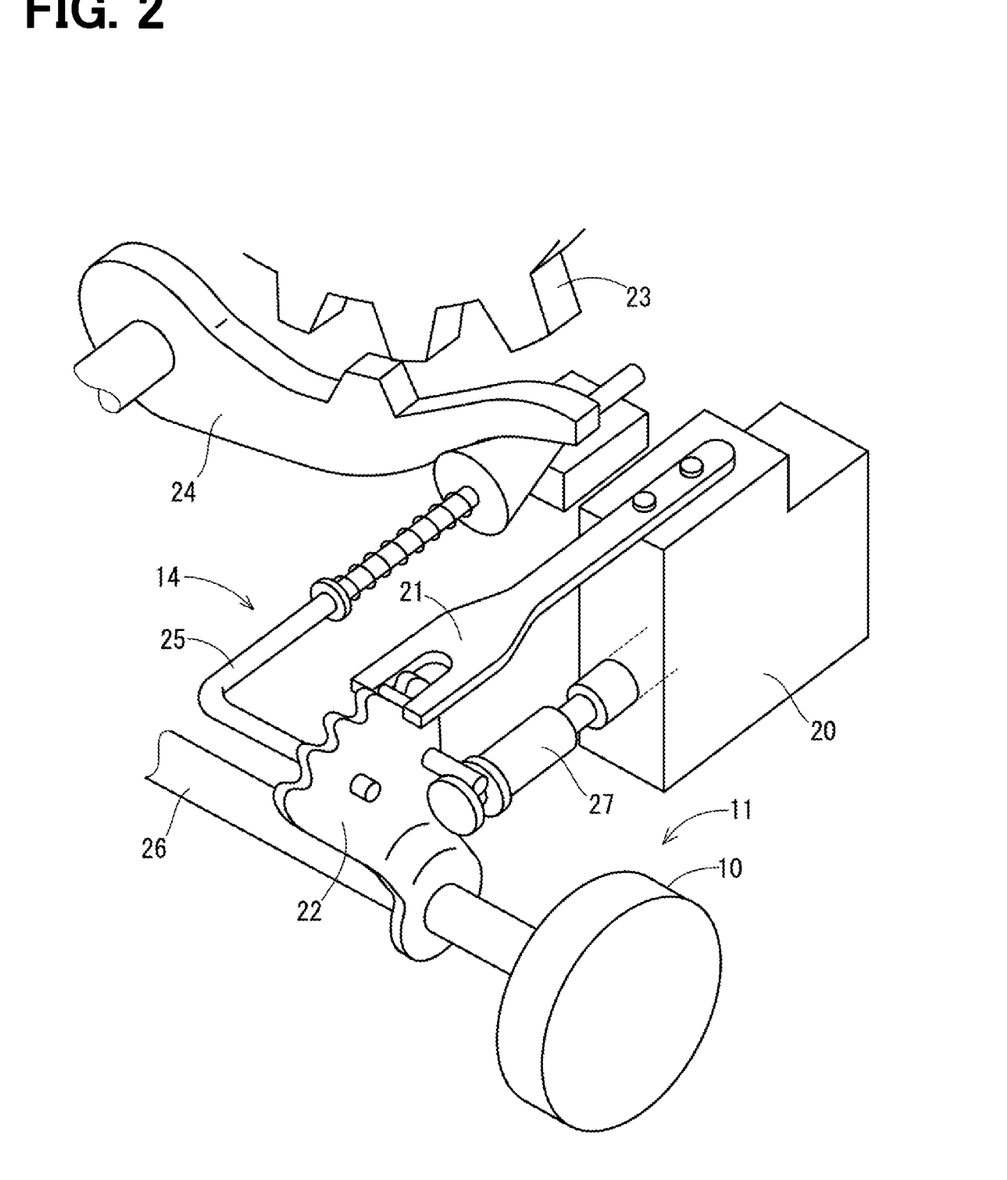
FIG. 2 is a diagram illustrating a shift range switching mechanism of FIG.

As shown in FIG. 2, the shift range switching mechanism 14 includes a range switching valve 20, a detent spring 21, a detent lever 22, a park rod 25, and a manual shaft 26. The range switching valve 20 controls an oil pressure to a hydraulic operating mechanism in the transmission 12 as shown in FIG. 1. The detent spring 21 and the detent lever 22 are configured to hold the shift range. The park rod 25 restricts a rotation of the output shaft when the shift range is switched to a parking range by having a park pole 24 fit into a park gear 23 of the output shaft of the transmission 12. The manual shaft 26 rotates together with the detent lever 22.

The shift range switching mechanism 14 rotates the manual shaft 26 together with the detent lever 22 connected to the park rod 25 and a valve body 27 of the range switching valve 20 to shift the park rod 25 and the valve body 27 to positions corresponding to a target shift range. The shift-by-wire system 11 is connected to the actuator 10 to switch the shift range electrically.
(Actuator)

Figure 3:
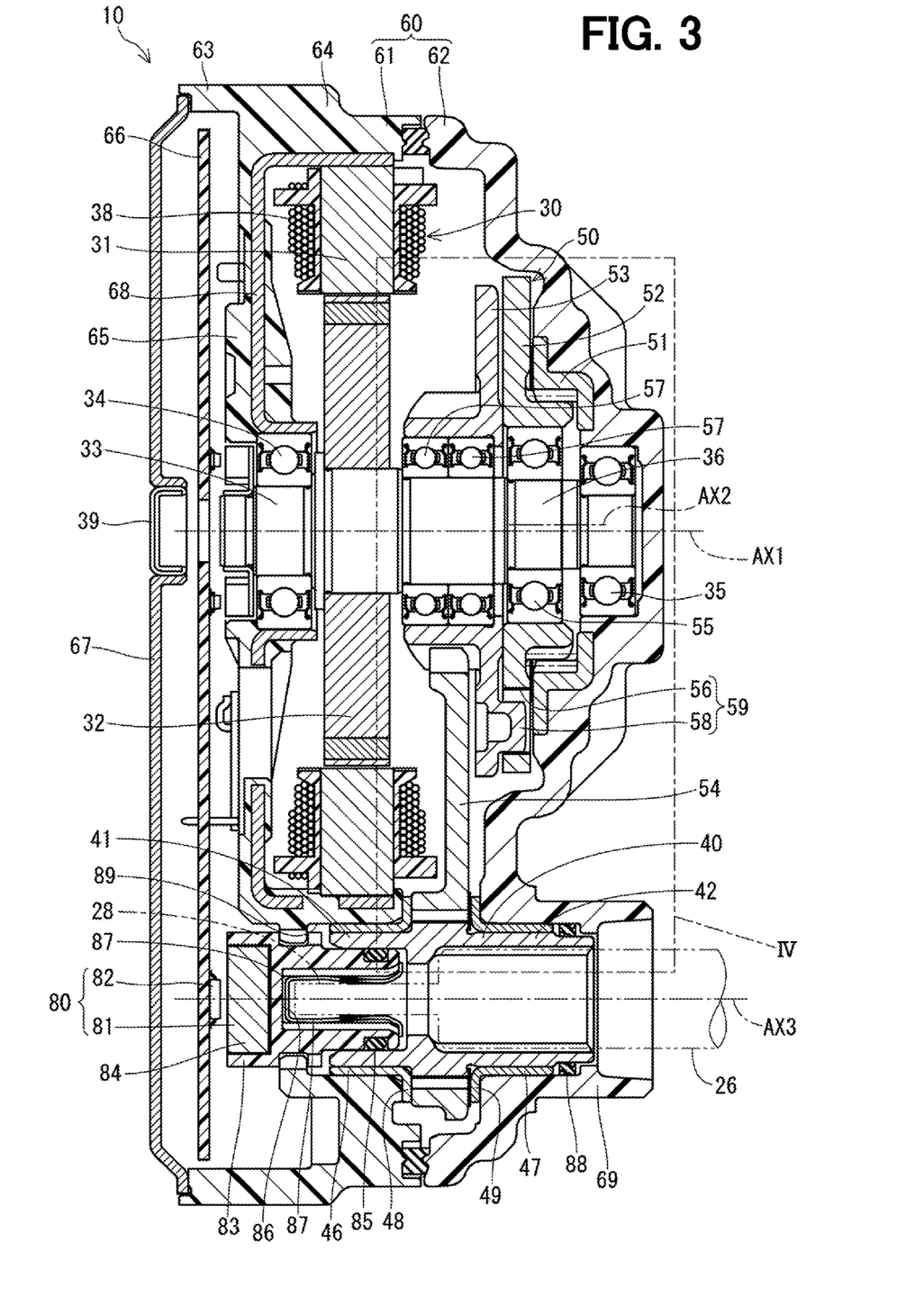
FIG. 3 is a cross-sectional view of the rotary actuator according to the first embodiment.

Next, a configuration of the actuator 10 will be described. As shown in FIG. 3, the actuator 10 includes a motor 30 as a driving source, an output shaft 40 disposed in parallel with the motor 30, a speed reducer 50, a case 60 housing the output shaft 40 and the speed reducer 50, and a rotational position detecting sensor 80. The speed reducer 50 is configured to reduce a rotational speed of the motor 30 and transmit the rotation of the motor 30 to the output shaft 40.

The case 60 includes an upper case 61 having a tubular shape and a lower case 62 having a cup shape. The upper case 61 houses the motor 30, and the lower case houses the speed reducer 50. The upper case 61 includes a partition 65 between one end 63 and the other end 64 of the upper case 61. The upper case 61 houses a control board 66 having the driving circuit and the control circuit (shown in FIG. 1) at a side of the partition 65 close to the one end 63. The control board 66 is fixed to the partition 65 by, for example, thermal fusing. The control board 66 is covered with a plate cover 67 made mainly of iron to secure shielding for the control board 66. The lower case 62 is assembled to the other end 64 of the upper case 61. The lower case 62 includes a tubular protrusion 69 protruding away from the upper case 61. The manual shaft 26 is inserted into the tubular protrusion 69.

The upper case 61 includes a plate case 68 at the other end 64. The motor 30 includes a stator 31 press-fit to the plate case 68 of the other end 64, a rotor 32 disposed inside the stator 31, and a motor shaft 33 configured to rotate about a rotary axis AX1 together with the rotor 32. The motor shaft 33 is rotatably supported by both a bearing 34 disposed at the plate case 68 and a bearing 35 disposed at the lower case 63. The motor shaft 33 includes an eccentric portion 36 that is deviated relative to the rotary axis AX1. The eccentric portion 36 is located between the rotor 32 and the lower case 62 in the axial direction. The control circuit (shown in FIG. 1) controls electricity applied to a three-phase winding 38 configuring the stator 31, so that the motor 30 is rotatable in both directions and stoppable at desired positions. The plate cover 67 defines a through hole, and a plug 39 is attached into the through hole. If the actuator 10 is broken down, the motor shaft 33 can be rotated manually by detaching the plug 39.

The speed reducer 50 includes the first reducer 71 having a ring gear 51 and a sun gear 52, and a second reducer 72 having a drive gear 53 and a driven gear 54 that serve as so-called parallel shafts type gears. The ring gear 51 is coaxially disposed with the rotation axis AX1. The sun gear 52 is rotatably supported about an eccentric axis AX2 by a bearing 55 that is fit into the eccentric portion 36. The sun gear 52 is engaged with, and inscribed in, the ring gear 51. The sun gear 52 performs a planetary motion that the sun gear 52 revolves around the rotary axis AX1 and rotates about the eccentric axis AX2 during the rotation of the motor shaft 33. A rotational speed of the sun gear 52 is reduced relative to a rotational speed of the motor shaft 33. The sun gear 52 defines a hole 56 for transmitting a rotation of the motor shaft 33.

The drive gear 53 is coaxially disposed with the rotary axis AX1 and rotatably supported about the rotation axis AX1 by a bearing 57 that is fit into the motor shaft 33. The drive gear 53 includes a protrusion 58 to be inserted into the hole 56 to receive the rotation of the sun gear 52. The rotation of the sun gear 52 is transmitted to the drive gear 53 through engagement between the hole 56 and the protrusion 58. The hole 56 and the protrusion 58 serve as a transmitting mechanism 59. The driven gear 54 is coaxially disposed with a rotation axis AX3 that is parallel with the rotation axis AX1 and on the same axis with the tubular protrusion 69, and is engaged with and circumscribed on the drive gear 53. The driven gear 54 rotates about the rotation axis AX3 in response to the rotation of the drive gear 53 about the rotation axis AX1. A rotational speed of the driven gear 54 is reduced relative to the rotational speed of the drive gear 53.

The output shaft 40 is formed into a cylindrical shape and coaxially disposed with the rotation axis AX3. The partition 65 defines a supporting through hole 89 coaxial with the rotation axis AX3. The output shaft 40 is rotatably supported about the rotation axis AX3 by both a first collar bushing 46 and a second collar bushing 47. The first collar bushing 46 and the second collar busing 47 are fit into the supporting through hole 89 and the tubular protrusion 69, respectively. The driven gear 54 is a separate member from the output shaft 40. The driven gear 54 is mechanically connected to the output shaft 40 by being fit to an outer part of the output shaft 40 to transmit the torque to the output shaft. The manual shaft 26 is inserted into the output shaft 40 and connected to the output shaft by, for example, a spline fitting to receive the rotary force.

An end 41 of the output shaft 40 is rotatably supported by the first collar bushing 46. The other end 42 of the output shaft 40 is rotatably supported by the second collar bushing 47. The driven gear 54 is supported in an axial direction of the output shaft 40 by being clamped between a first collar 48 of the first collar bushing 46 and a second collar 49 of the second collar bushing 47. In other embodiment, the driven gear 54 may be supported in the axial direction by being clamped between a pair of supporters formed of the case 60, other plates, or the like.

The rotational position detecting sensor 80 includes a magnetic circuit 81 and a magnetic sensor 82. The magnetic circuit 81 is attached to the output shaft 40. Specifically, the magnetic circuit 81 is integrally formed with a holder 83 and a magnet 84. A position of the holder 83 in a thrust direction of the holder 83 is restricted by the upper case 61 and a position of the holder 83 in a radial direction of the holder 83 is also restricted by the output shaft. The rotational position detecting sensor 80 detects rotational positions of the output shaft 40 and the manual shaft 26 rotating together with the output shaft 40, and outputs detection results to the ECU 18. In other embodiments, the magnetic circuit may be disposed at the output shaft 40 or an element rotating together with the output shaft 40 (e.g., the manual shaft). The holder of the magnetic circuit may be integrally formed with the output shaft 40 or the manual shaft 26, and the magnet of the magnetic circuit may be fixed to the holder by adhesion or integral molding.

The holder 83 is inserted into the end 41 of the output shaft 40. An O-ring 85 is disposed between the holder 83 and the end 41. The holder 83 defines a bottomed hole 86 at an end of the holder 83 facing the output shaft 40. A spring 87 is fit into the bottomed hole 86. The spring 87 holds a dihedral width part 28 formed at an end of the manual shaft 26 by a spring force in a direction to reduce a space between the manual shaft 26 and the bottomed hole 86.

An X-ring 88 is disposed between the other end 42 of the output shaft 40 and the tubular protrusion 69. Typically, a sealing member may be used to seal a space between the transmission of the actuator and a transmission case. In this disclosure, however, the X-ring 88 is disposed between the other end 42 and the tubular protrusion 69, thus sealing between the other end 42 and the tubular protrusion 69 is secured without an additional sealing member as described above.

(Speed Reducer)

Figure 4:
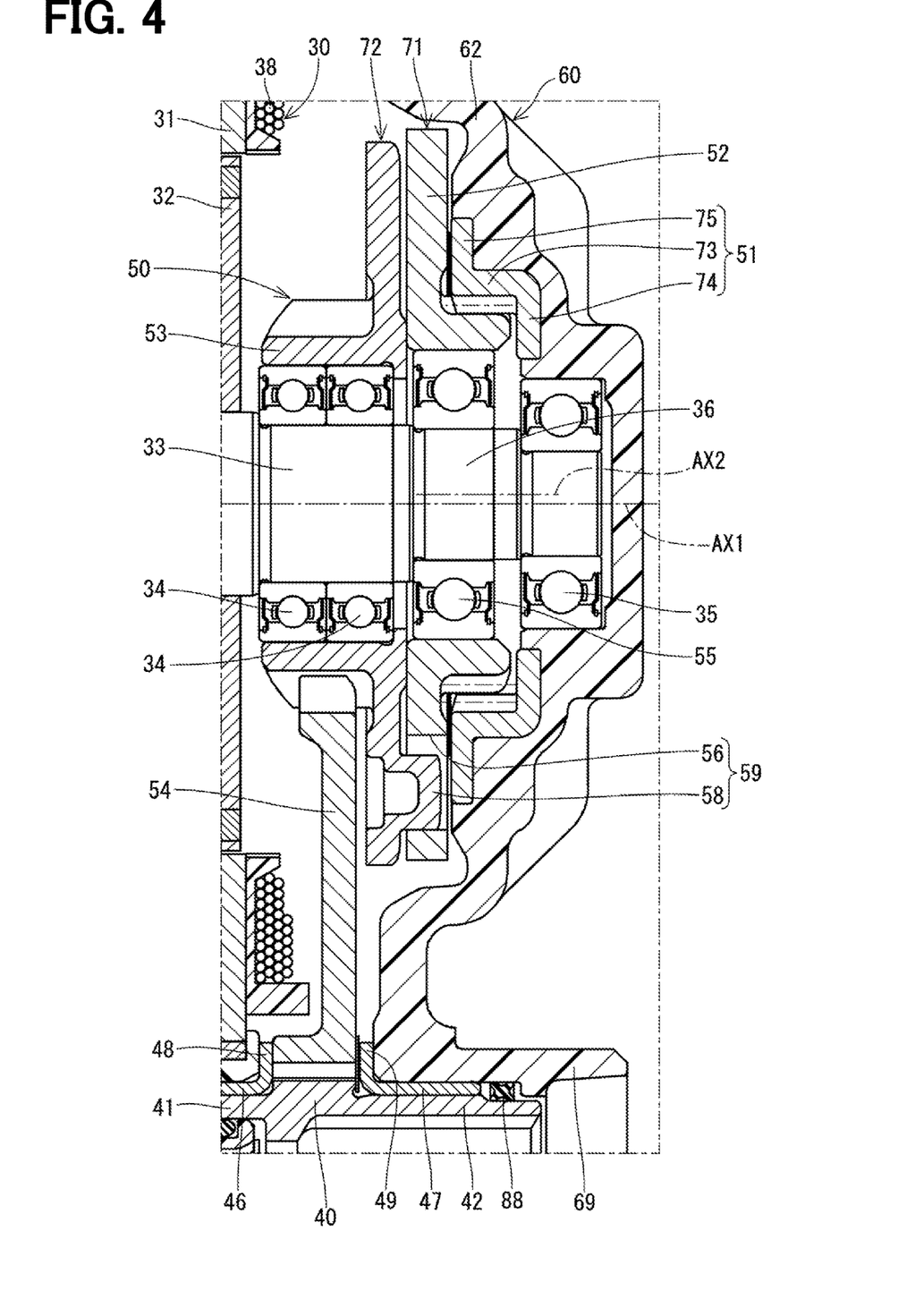
FIG. 4 is an enlarged view of IV part in FIG. 3.

Next, the configurations of the speed reducer 50 and its peripheral components will be described. As shown in FIG. 4, the first reducer 71 is disposed close to the lower case 62 and the parallel-shaft type second reducer 72 is disposed between the motor 30 and the first reducer 71. That is, the second reducer 72 and the first reducer 71 are arranged in this order from the motor 30. The drive gear 53 and the ring gear 51 do not overlap with each other in the axial direction.

The ring gear 51 has an annular gear portion 73 having inner teeth formed thereon and an annular and plate-shaped cover 74 protruding radially inward from one end of the gear portion 73 that is close to the lower case 62. In the present embodiment, a flange 75 that protrudes radially outward from the other end of the gear portion 73 close to the driven gear 54 is further formed. The gear portion 73, the cover 74, and the flange 75 are integrally formed as a single member.

The ring gear 51 is fixed to the lower case 62. Specifically, the ring gear 51 is embedded in a resin portion of the lower case 62 by insert molding such that outer wall surfaces in the radial direction of the gear portion 73, the cover 74, and the flange 75 are in close contact with the inner wall surface of the lower case portion 62.

As described above, in the first embodiment, the actuator 10 includes the motor 30, the output shaft 40 disposed in parallel with the motor shaft 33 of the motor 30, and the speed reducer 50 that reduces a rotational speed of the motor and transmits rotation of the motor 30 at a reduced rotational speed to the output shaft 40, and the case 60 that houses the motor 30 and the speed reducer 50.

The case 60 includes the cylindrical upper case 61 located close to the motor 30 and the cup-shaped lower case 62 located close to the speed reduction mechanism 50. The speed reducer 50 includes the first reducer 71 including the ring gear 51 embedded in the resin portion of the lower case 62 and the parallel-shaft type second reducer 72 including the drive gear 53 on the motor shaft 33 and the driven gear 54 on the output shaft 40. The ring gear 51 includes the annular gear portion 73 and the cover 74 protruding radially inward from the one end of the gear portion 73.

By embedding the ring gear 51 in the resin portion of the case 60, it is not necessary to assemble the ring gear 51 to the case 60 during an assembling process, and it is not necessary to use any fastening means. Therefore, the number of the components can be reduced and the assembling process can be simplified.

Further, since the ring gear 51 has the cover 74, it is possible to prevent resin burrs generated during manufacturing of the case 60 from adhering to the gear portion 73 of the ring gear 51. Further, since the ring gear 51 is integrally formed with the case 60, deformation of the ring gear 51 during operation of the rotary actuator 10 can be suppressed, and as a result gear efficiency is improved.

If the ring gear is screwed into the upper case, the ring gear and the upper case must be positioned using positioning pins. In contrast, according to the present embodiment in which the ring gear 51 is integrally formed with the lower case 62, the ring gear 51 and the rotor 32 of the motor 30 can be prevented from offsetting from each other without positioning means, and thus the gear efficiency is further improved.

Here, in a rotary actuator of a comparative example, the first reducer and the parallel-shaft type second reducer are arranged in the axial direction in this order from the motor. The ring gear is screwed to the upper case. In such a configuration, the ring gear cannot be embedded in the case.

On the contrary, in the first embodiment, the first reducer 71 is disposed close to the lower case 62 and the parallel-shaft type second reducer 72 is disposed between the motor 30 and the first reducer 71. That is, the second reducer 72 and the first reducer 71 are arranged in this order from the motor 30. With such an arrangement, the ring gear 51 can be embedded in the case 60.

In the first embodiment, the gear 73 and the cover 74 are integrally formed as a single member. As a result, since the ring gear 51 is formed as a single member, it is possible to avoid an increase in the number of components.

Second Embodiment

Figure 5:
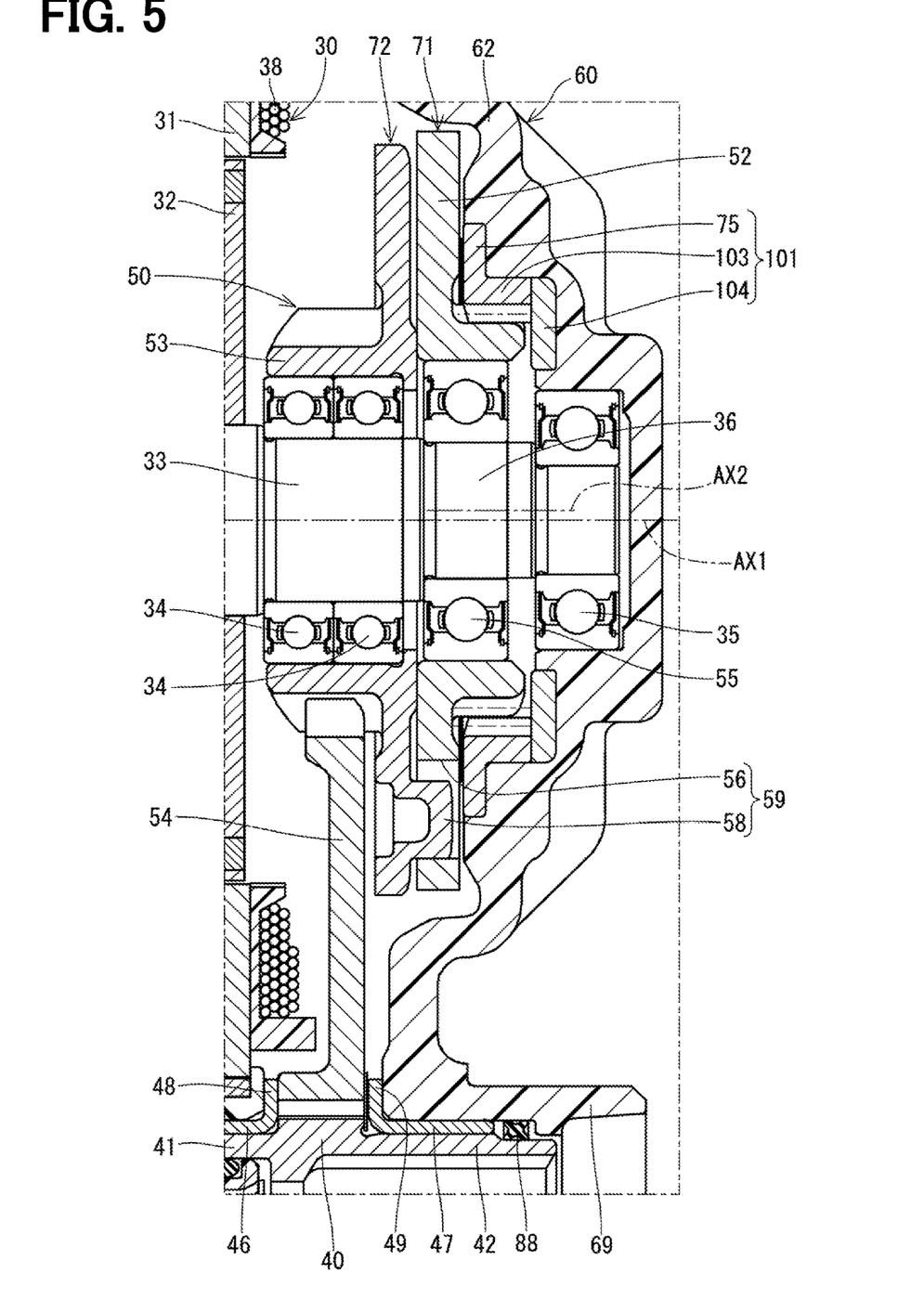
FIG. 5 is an enlarged view of a rotary actuator around a speed reducer according to a second embodiment.

In the second embodiment, as shown in FIG. 5, a gear portion 103 and the cover 104 of the ring gear 101 are formed as separate members. The gear portion 103 and the cover 104 are made of different materials. For example, the gear portion 103 is made of metal, and the cover 104 is made of resin. The gear portion 103 and the cover 104 are embedded in the resin portion of the lower case 62 in a state where the gear portion 103 and the cover 104 are in contact with each other. The melting point of the resin of the cover 104 is set to be higher than the melting point of the resin of the lower case 62. Since the gear portion 103 and the cover 104 are formed as different members in this manner, the internal teeth of the gear portion 103 can be easily formed, so that the processing cost of the ring gear 101 can be reduced. In another embodiment, the gear portion and the cover may be made of the same material such as a metal.

Third Embodiment

Figure 6:
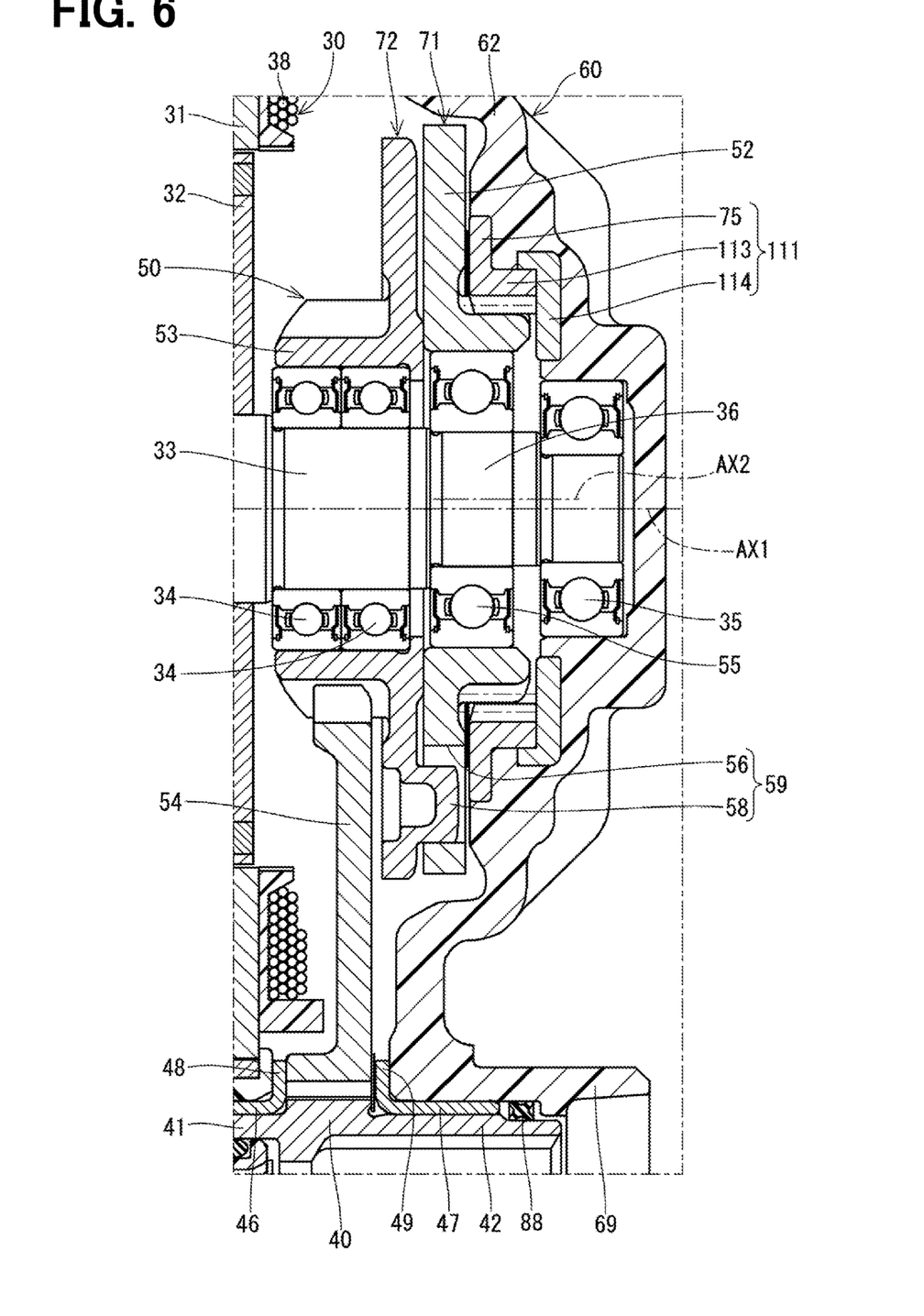
FIG. 6 is an enlarged view of a rotary actuator around a speed reducer according to a third embodiment.

In the third embodiment, as shown in FIG. 6, a gear portion 113 and a cover 114 of the ring gear 111 are formed as separate members. The gear portion 113 and the cover 114 are made of metal with the same material and are embedded in the resin portion of the lower case 62 with the cover 114 being press-fit to the outside of the gear portion 113. By separately forming the gear portion 113 with the cover 114, the processing cost of the ring gear 111 can be reduced as with the second embodiment.

Fourth Embodiment

Figure 7:
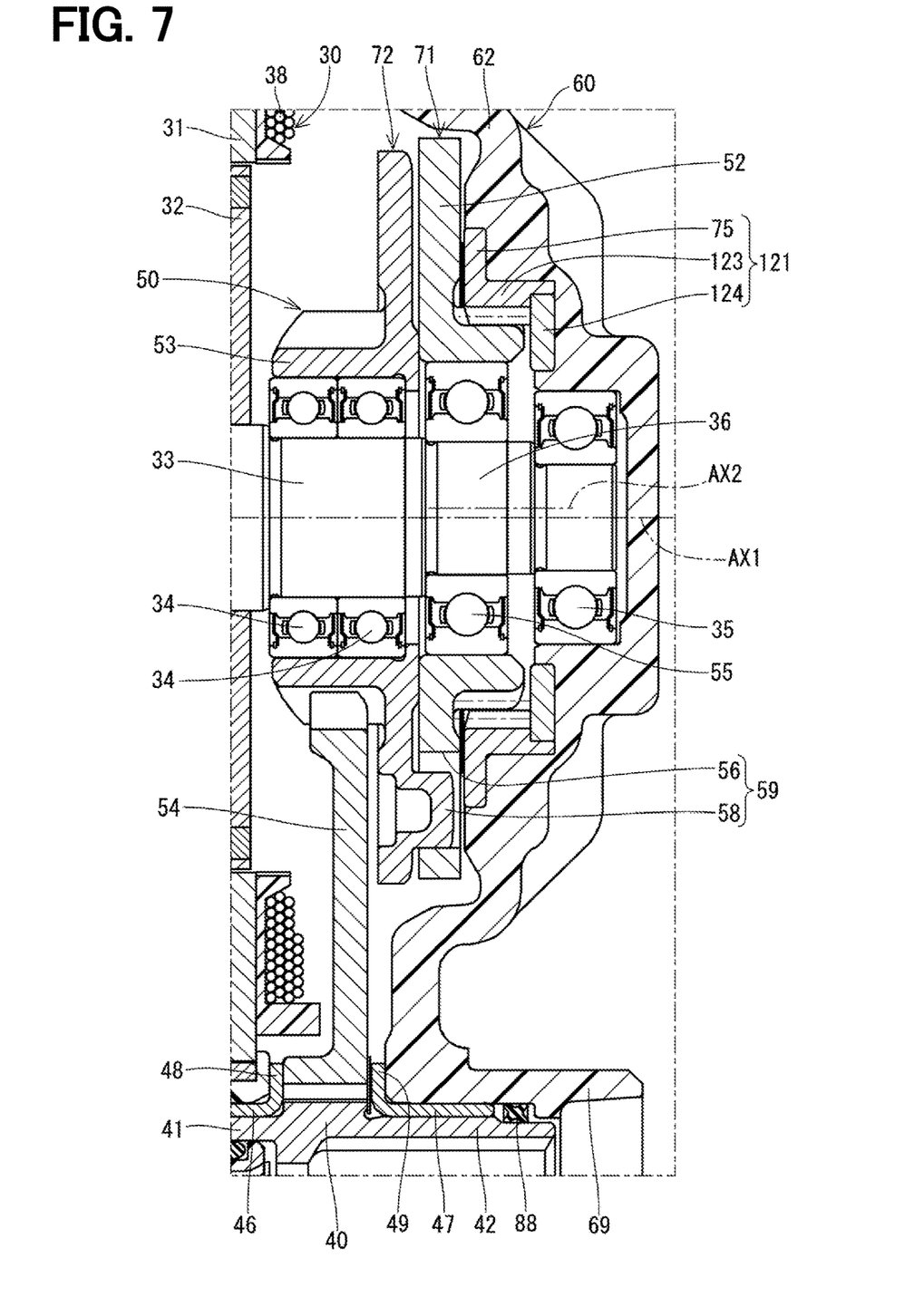
FIG. 7 is an enlarged view of a rotary actuator around a speed reducer according to a fourth embodiment.

In the fourth embodiment, as shown in FIG. 7, the ring gear 121 is embedded in the resin portion of the lower case 62 with the cover 124 press-fitted into the gear portion 123. By separately forming the gear portion 123 with the cover 124, the processing cost of the ring gear 121 can be reduced as with the second embodiment.

Fifth Embodiment

Figure 8:
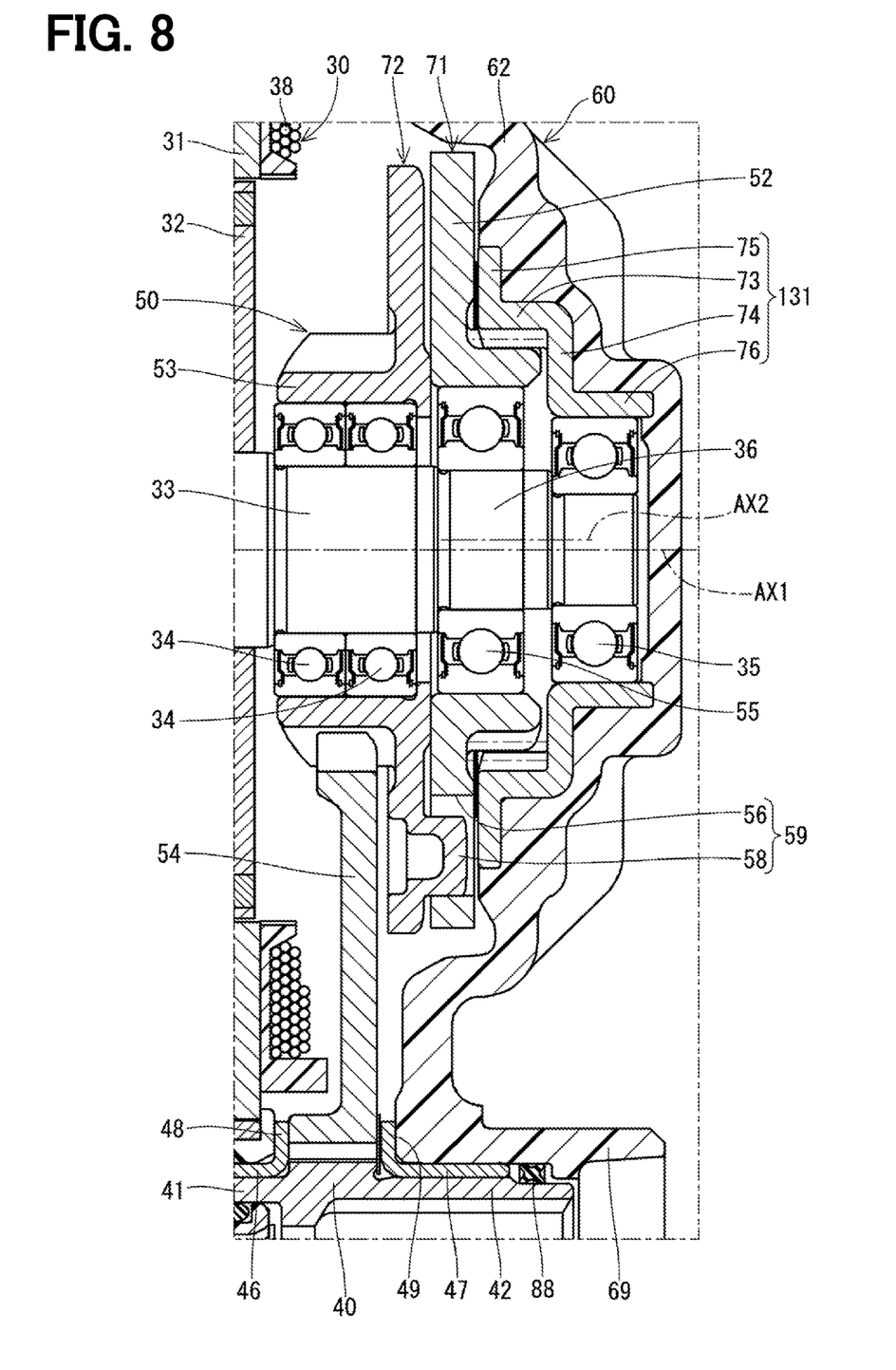
FIG. 8 is an enlarged view of a rotary actuator around a speed reducer according to a fifth embodiment.

In the fifth embodiment, as shown in FIG. 8, the ring gear 131 has a bush 76 protruding away from the sun gear 52 in the axial direction from a radially inner end of the cover 74. In the first embodiment, the bush 76 is integrally formed with the gear 73 and the cover 74 as a single member. As a result, since the ring gear 131 is formed as a single member, it is possible to avoid an increase in the number of parts as with the first embodiment.

The bearing 35 is fitted into the bush 76. As a result, positioning of the ring gear 131 and the rotor 32 is fixed without the lower case 62. Therefore, the ring gear 131 and the rotor 32 are further prevented from offsetting from each other, and thus the gear efficiency is improved.

Other Embodiments

Figure 9:
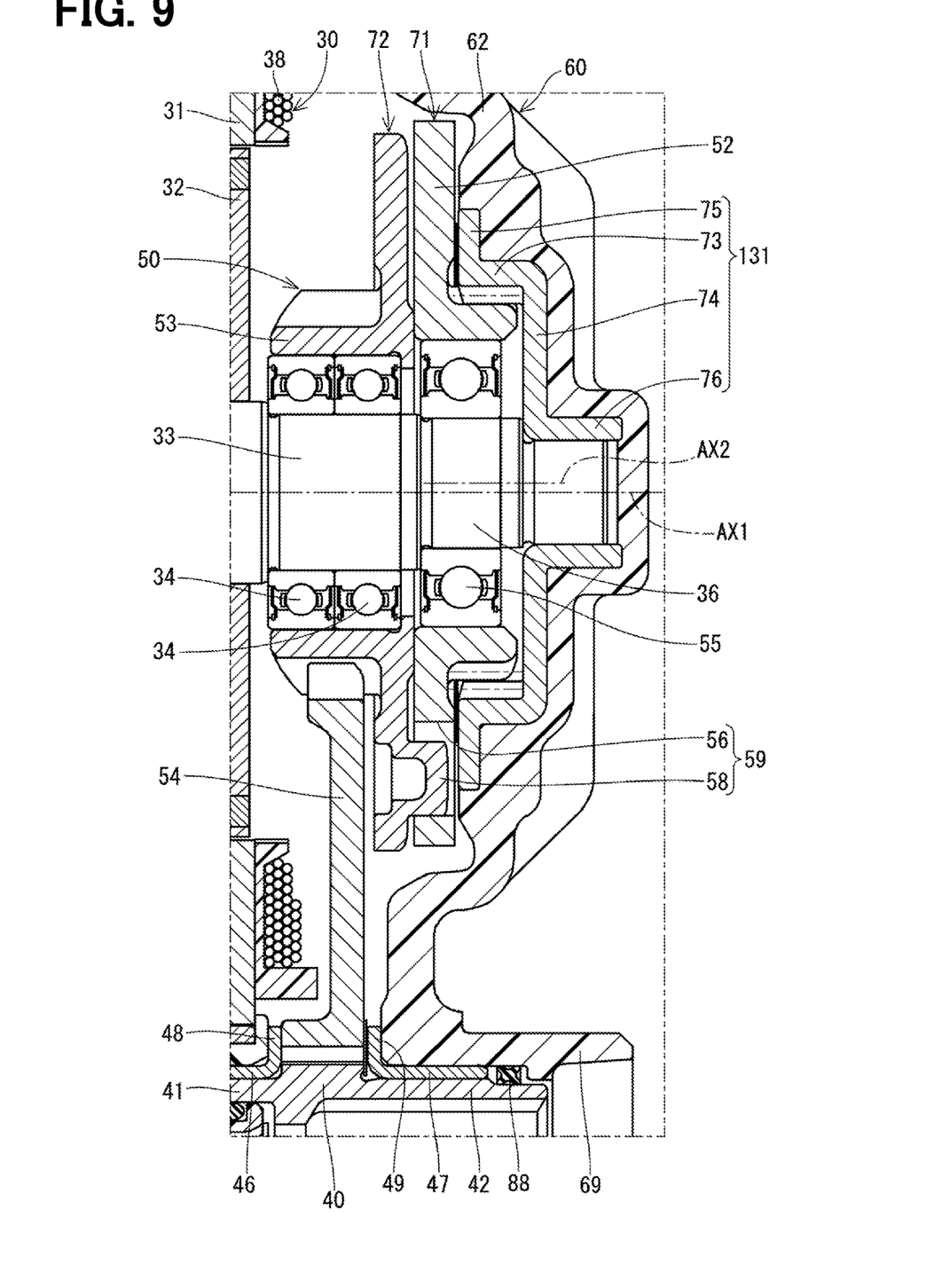
FIG. 9 is an enlarged view of a rotary actuator around a speed reducer according to another embodiment.

In other embodiments, the ring gear may need not have a flange. Further, in another embodiment, the gear portion and the cover that are formed as separate members may be fixed by another means other than press-fitting. Further, in yet another embodiment, as shown in FIG. 9, the bush 76 may directly support the motor shaft 33. Further, in yet another embodiment, the first reducer is not necessarily limited to the hypocycloid speed reducer, and may be another type of speed reducer having a ring gear.

The present disclosure is not limited to the embodiments described above, and can be implemented in various forms without departing from the spirit of the invention.

The invention claimed is:

1. A rotary actuator used in a shift-by-wire system for a vehicle, the actuator comprising:
   a motor that includes a motor shaft;
   an output shaft that is disposed in parallel with the motor shaft;
   a speed reducer that reduces a rotational speed of the motor and transmits rotation of the motor at a reduced rotational speed to the output shaft; and
   a case that houses the motor and the speed reducer, wherein
   the case includes an upper case that houses the motor and a lower case that houses the speed reducer,
   the speed reducer includes a first reducer that includes a ring gear unrotatably embedded in a resin portion of the lower case and a parallel-shaft type second reducer that includes a drive gear on the motor shaft and a driven gear on the output shaft,
   the ring gear includes an annular gear portion and a cover that protrudes radially inward from one end of the annular gear portion, and
   the ring gear is integrally formed with the resin portion of the lower case by insert molding so that an outer wall surface of the ring gear is in close contact with an inner surface of the lower case.

2. The rotary actuator according to claim 1, wherein the annular gear portion and the cover are formed as a single member.

3. The rotary actuator according to claim 1, wherein the annular gear portion and the cover are formed as separate members.

4. The rotary actuator according to claim 1, wherein the ring gear further includes a bush that protrudes from the cover in an axial direction of the ring gear.

5. The rotary actuator according to claim 1, wherein the rotary actuator further comprises a sun gear engaged with ring gear, and the sun gear is configured to rotate during rotation of the motor shaft.

6. The rotary actuator according to claim 1, wherein the rotary actuator further comprises a sun gear engaged with ring gear, and the sun gear is configured to perform a planetary motion such that the sun gear revolves around an axis about which the motor shaft is configured to rotate.

7. The rotary actuator according to claim 1, wherein the ring gear further includes a flange that protrudes radially outward from an other end of the annular gear portion.

8. A shift-by-wire system for a vehicle, the shift-by-wire system comprising:
   a shift range switching mechanism of a transmission, shift ranges of the transmission including at least a park range, a reverse range, a neutral range and a drive range;
   a rotary actuator configured to drive the shift range switching mechanism;
   control circuitry configured to control the rotary actuator; wherein:
   the rotatory actuator comprises:
      a motor that includes a motor shaft;
      an output shaft that is disposed in parallel with the motor shaft;
      a speed reducer that reduces a rotational speed of the motor and transmits rotation of the motor at a reduced rotational speed to the output shaft; and
      a case that houses the motor and the speed reducer,
   the case includes an upper case that houses the motor and a lower case that houses the speed reducer,
   the speed reducer includes a first reducer that includes a ring gear unrotatably embedded in a resin portion of the lower case and a parallel-shaft type second reducer that includes a drive gear on the motor shaft and a driven gear on the output shaft, and
   the ring gear includes an annular gear portion and a cover that protrudes radially inward from one end of the annular gear portion, and
   the ring gear is integrally formed with the resin portion of the lower case by insert molding so that an outer wall surface of the ring gear is in close contact with an inner surface of the lower case.

9. The shift-by-wire system according to claim 8, wherein
the annular gear portion and the cover are formed as a single member.

10. The shift-by-wire system according to claim 8, wherein
the annular gear portion and the cover are formed as separate members.

11. The shift-by-wire system according to claim 8, wherein
the ring gear further includes a bush that protrudes from the cover in an axial direction of the ring gear.

12. The shift-by-wire system according to claim 8, wherein the rotary actuator further comprises a sun gear engaged with ring gear, and the sun gear is configured to rotate during rotation of the motor shaft.

13. The shift-by-wire system according to claim 8, wherein the rotary actuator further comprises a sun gear engaged with ring gear, and the sun gear is configured to perform a planetary motion such that the sun gear revolves around an axis about which the motor shaft is configured to rotate.

14. The shift-by-wire system according to claim 8, wherein
the ring gear further includes a flange that protrudes radially outward from an other end of the annular gear portion.

* * * * *